United States Patent
Schwarz et al.

(10) Patent No.: US 11,087,478 B2
(45) Date of Patent: Aug. 10, 2021

(54) RECOVER KEYPOINT-BASED TARGET TRACKING FROM OCCLUSION USING DEEP NEURAL NETWORK SEGMENTATION

(71) Applicant: Lenovo (Singapore) Pte. Ltd., Singapore (SG)

(72) Inventors: David Alexander Schwarz, Morrisville, NC (US); Krishna C. Garikipati, Chicago, IL (US); John Weldon Nicholson, Cary, NC (US); Jun Ki Min, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 80 days.

(21) Appl. No.: 16/600,080

(22) Filed: Oct. 11, 2019

(65) Prior Publication Data
US 2021/0110553 A1    Apr. 15, 2021

(51) Int. Cl.
*G06T 7/246* (2017.01)
*G06T 7/73* (2017.01)

(52) U.S. Cl.
CPC ............... *G06T 7/251* (2017.01); *G06T 7/75* (2017.01); *G06T 2207/10016* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2017/0053167 A1* 2/2017 Ren ........................... G06T 3/40

* cited by examiner

*Primary Examiner* — Leon Flores
(74) *Attorney, Agent, or Firm* — VanLeeuwen & VanLeeuwen; Philip L. Weinstein

(57) ABSTRACT

An approach is provided that captures a set of sequential images of an area where there is a selected moving object. Both a keypoint-based (KP-based) matching model and a neural network based (NN-based) matching model are used with the KP-based matching model analyzing most or all of the captured images and the NN-based model being more computational intensive and analyzing a subset of the images. When the KP-based matching model fails to identify the selected object in an image, the NN-based model is used to find the object so that the KP-based matching model can re-establish tracking of the object.

20 Claims, 7 Drawing Sheets

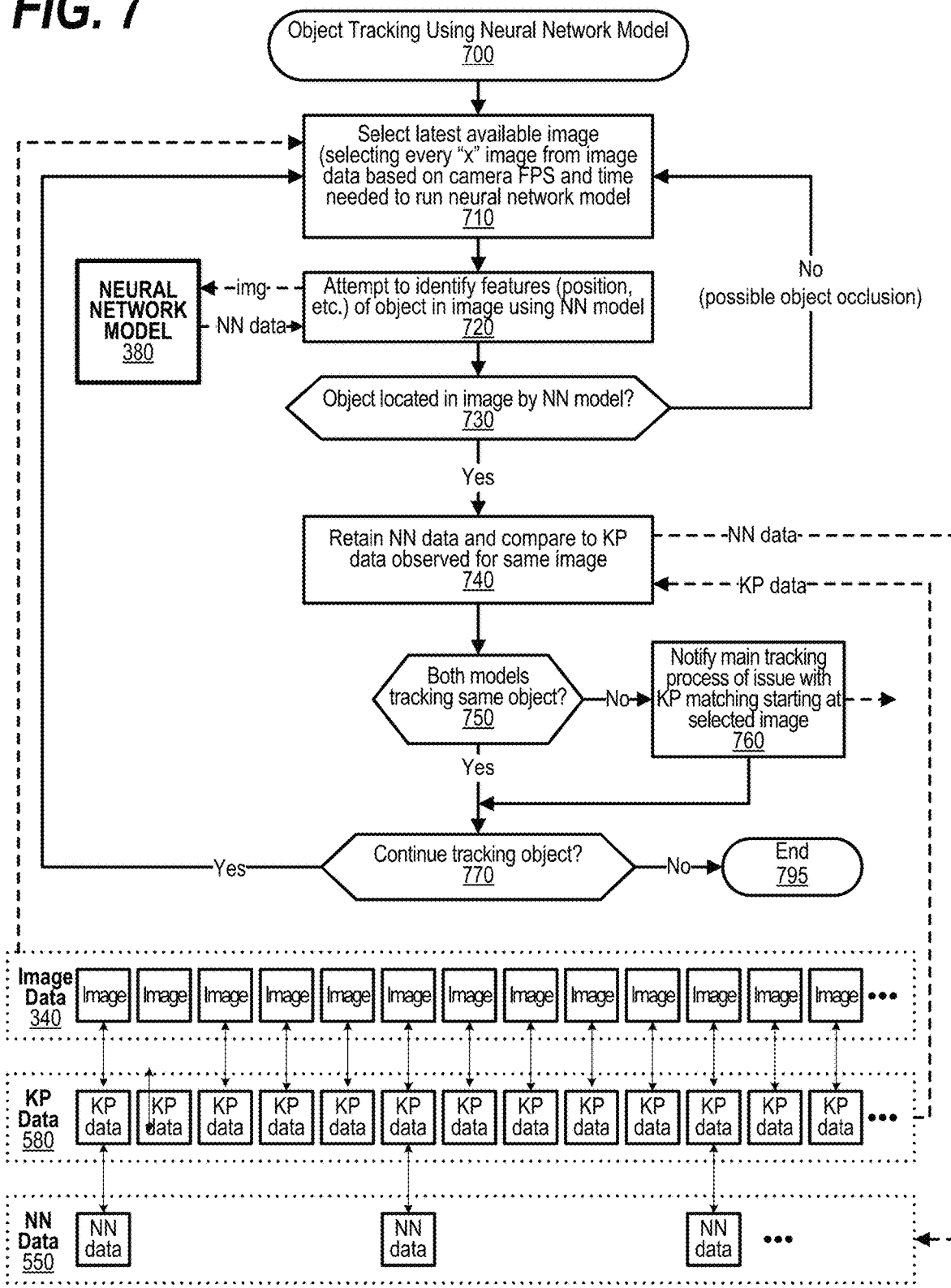

RECOVER KEYPOINT-BASED TARGET TRACKING FROM OCCLUSION USING DEEP NEURAL NETWORK SEGMENTATION

BACKGROUND

Object tracking is challenged when occlusion occurs. When tracking an object such as an automobile, occlusion occurs when the object becomes hidden by an object, terrain, or the like. For example, when tracking a car, occlusion can occur when the car enters a tunnel and the tracking device is outside the tunnel, or when an object such as a semi-truck is between the tracking device and the automobile. Keypoint-based tracking methods are commonly used for general purpose object tracking where the features of the object are not well known and are therefore determined at the time tracking commences. Because of this, their features are generated a priori (independently from other sources/experiences) and therefore can be polluted by noise, background, blur or other image artifacts, including bad initial conditions prior to tracking. Traditional keypoint tracking systems do not recover well from occlusions as occlusions will often cause keypoints to drift, or match, to a different object once the occlusion is no longer present.

SUMMARY

An approach is provided that captures a set of sequential images of an area where there is a selected moving object. Both a keypoint-based (KP-based) matching model and a neural network based (NN-based) matching model are used with the KP-based matching model analyzing most or all of the captured images and the NN-based model being more computational intensive and analyzing a subset of the images. When the KP-based matching model fails to identify the selected object in an image, the NN-based model is used to find the object so that the KP-based matching model can re-establish tracking of the object.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein:

FIG. 7 is a flowchart showing steps taken by a process that shows steps taken by a neural network model during the tracking of an object.

DETAILED DESCRIPTION

The figures show an approach that combines a heuristic for determining when to use a very accurate neural network segmentation network to extract features from a target, then feed those features into a less accurate but computationally faster keypoint matcher tracker. The solution also determines when to re-invoke the neural network classifier when the target has been lost or occluded.

The features of the solution include following. First, a neural network model trained on the features of the target. Second, a naïve keypoint matcher, such as Median Flow or Multiple Instance Learning is used to track an object. Third, a model containing heuristics and methods for determining occlusion or poor tracking performance is utilized to determine if the keypoint matcher loses the object. Fourth, a model that supplies the necessary initial conditions, such as a region of interest, gradient, histograms, or the like, is provided to the tracker by leveraging the quality segmentation result. Finally, an algorithm is disclosed that determines when to switch between the keypoint matcher model and the neural network model depending on the tracker state, such as whether the object has been acquired or is presently lost.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
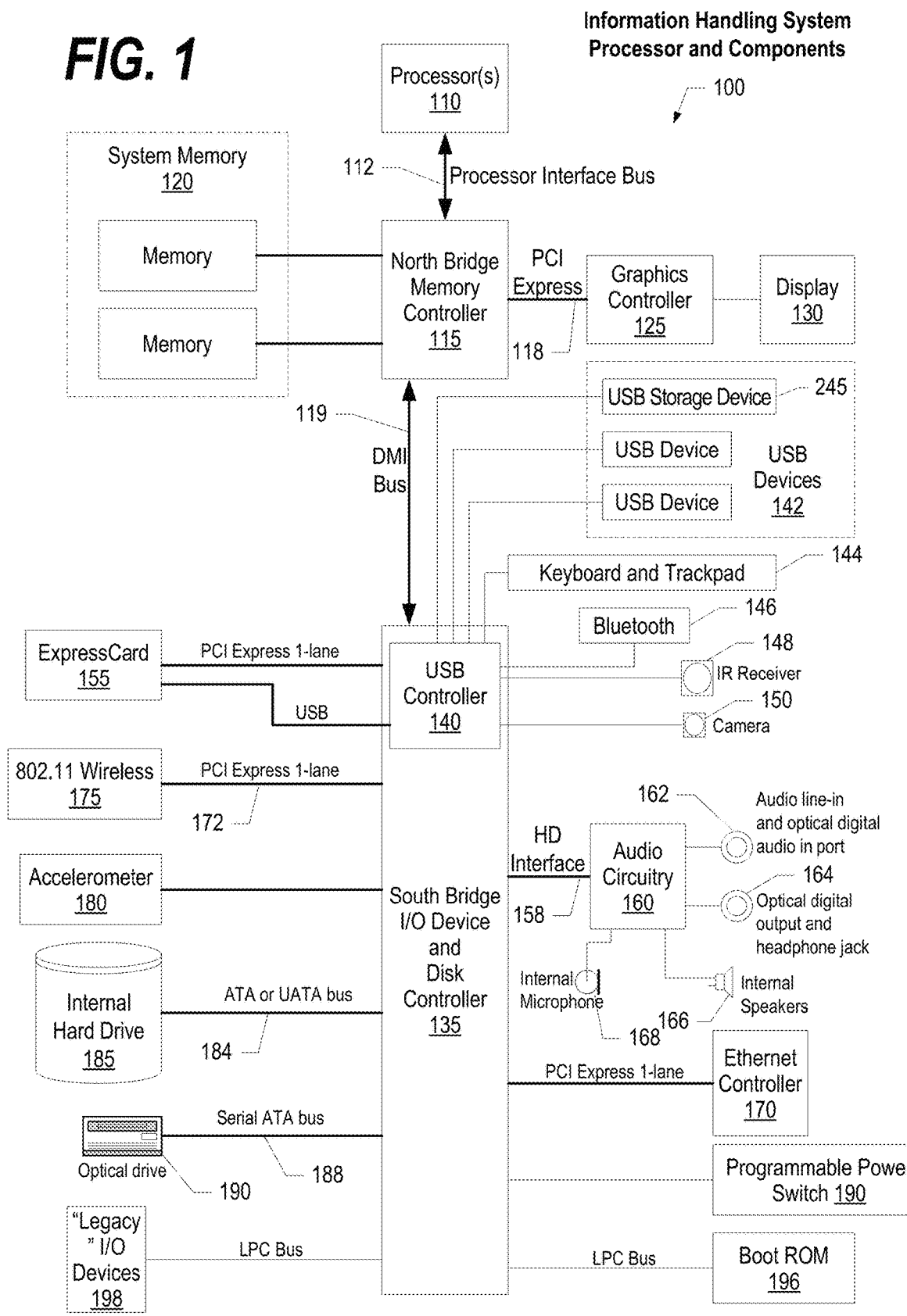
FIG. 1 is a block diagram of a data processing system in which the methods described herein can be implemented.
Figure 2:
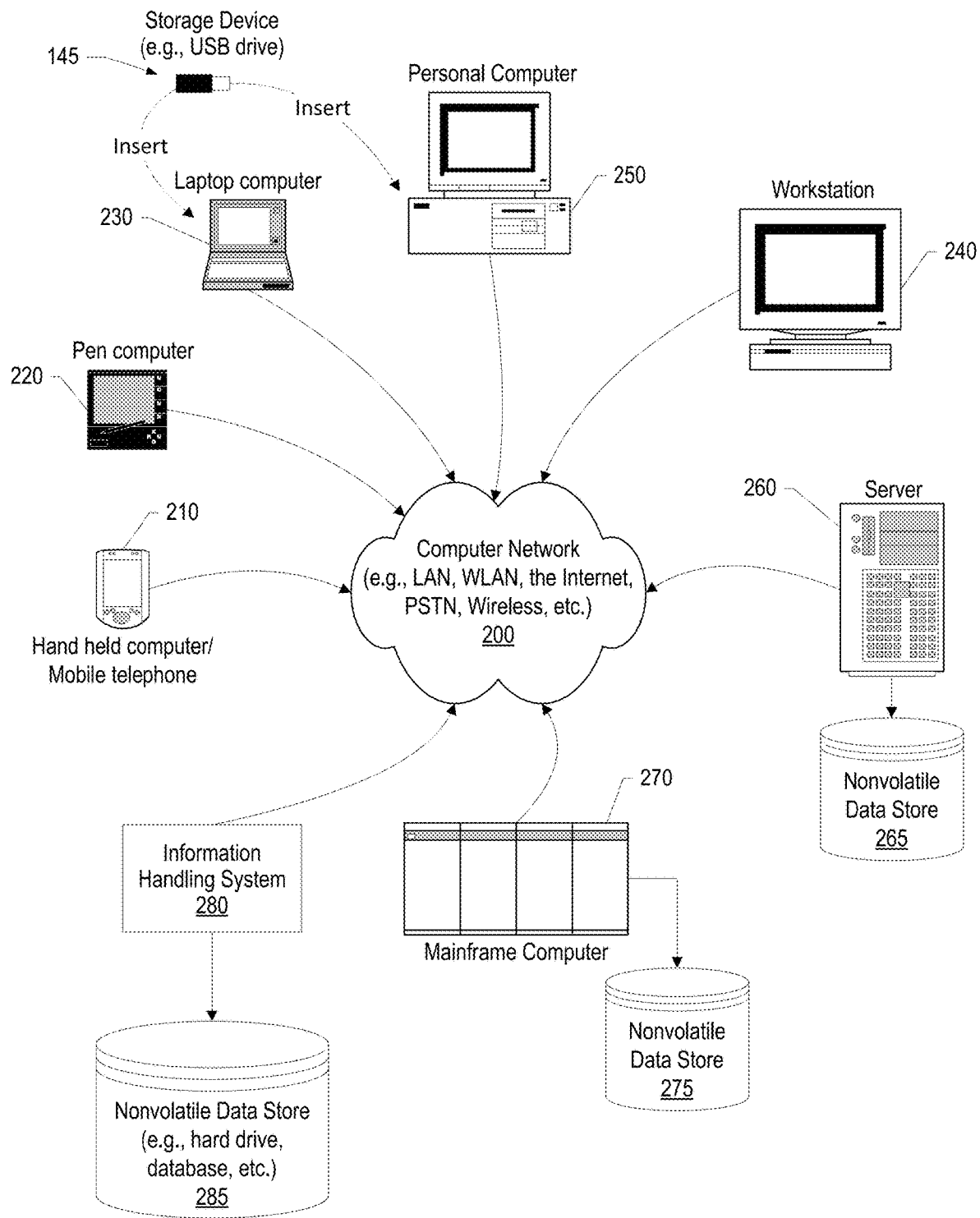
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 vithe PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
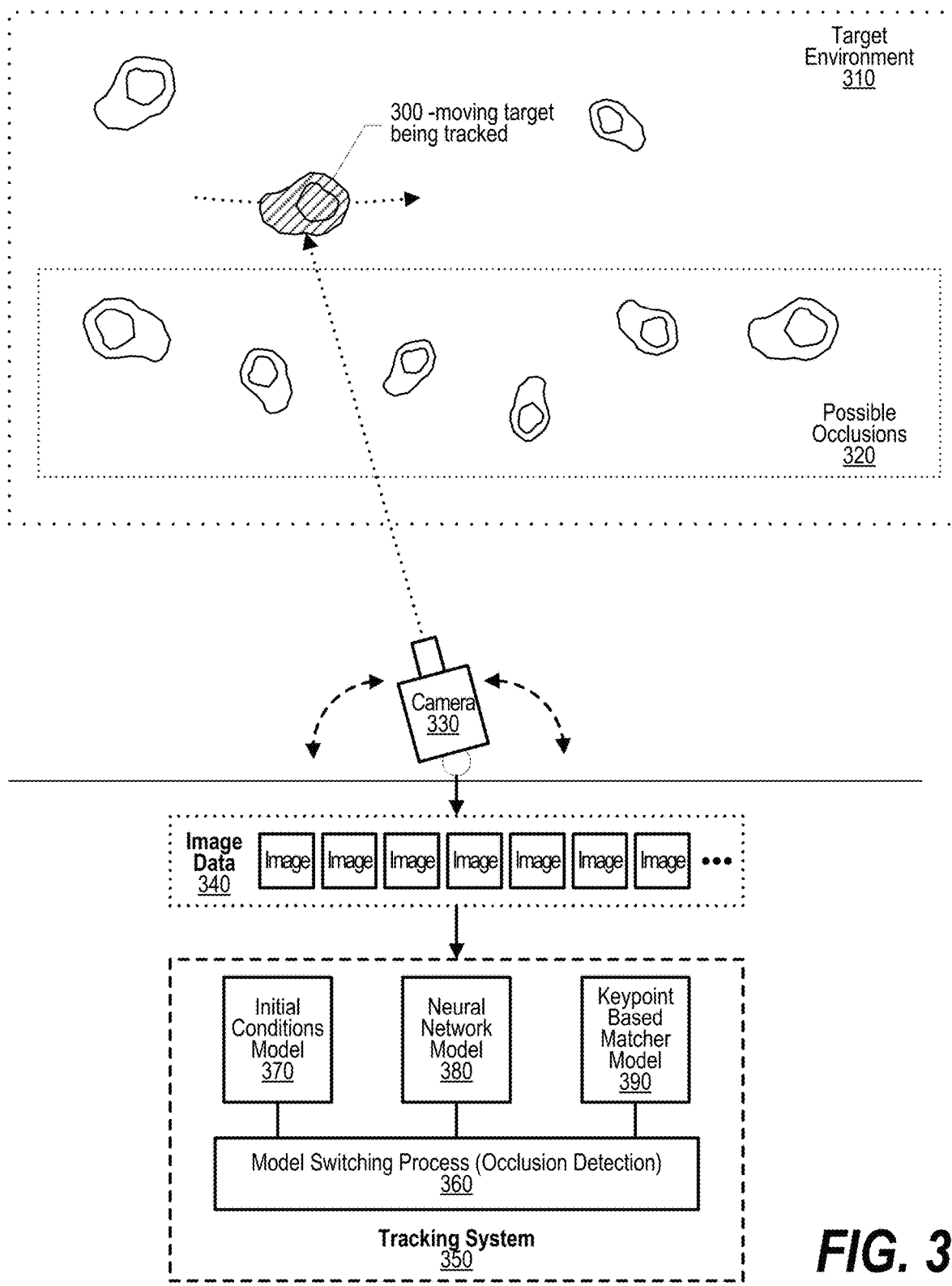
FIG. 3 is a component diagram depicting the components used in recovering an object being tracked by keypoint matching using a neural network tracker.

FIG. 3 is a component diagram depicting the components used in recovering an object being tracked by keypoint matching using a neural network tracker. Digital camera 330 is moveable and captures digital images 340 of an area, such as target environment 310, with the focus being selected moving object 300, such as an asteroid, an automobile, a person, or the like. Other objects, shown as possible occlusions 320, might occlude, or block, the selected object thus preventing the digital camera from capturing an image where the selected moving object is visible. The length of time that the selected moving object is occluded from view depends on a variety of factors, such as the speed and size of the objects. In addition, due to "noise" of other nearby objects, some tracking models, such as some keypoint-based (KP-based) matching models may become confused due to other objects' proximity in the digital image to the selected moving object and may start tracking a different object other than the selected moving object.

Tracking system 350 utilizes both KP-based matching model 390 and neural-network based (NN-based) tracking model 380 to more accurately track the selected moving object. Initial conditions model 370 uses the NN-based matching model to capture an accurate set of features of the selected moving object that is being tracked. This accurate set of features is fed to the KP-based matching model to initialize tracking with the KP-based matching model. Model switching process 360 is used to verify that the KP-based matching model is tracking the selected moving object and is not tracking some other object or has not lost the object due to an occlusion. When the model switching process determines that the KP-based matching model is either tracking the wrong object or has lost track of the selected moving object, then the process utilizes data from the NN-based matching model to identify the selected moving object in one of the images 340 and this set of location data is provided to the KP-based matching model to re-establish tracking of the selected moving object using the KP-based matching model.

Figure 4:
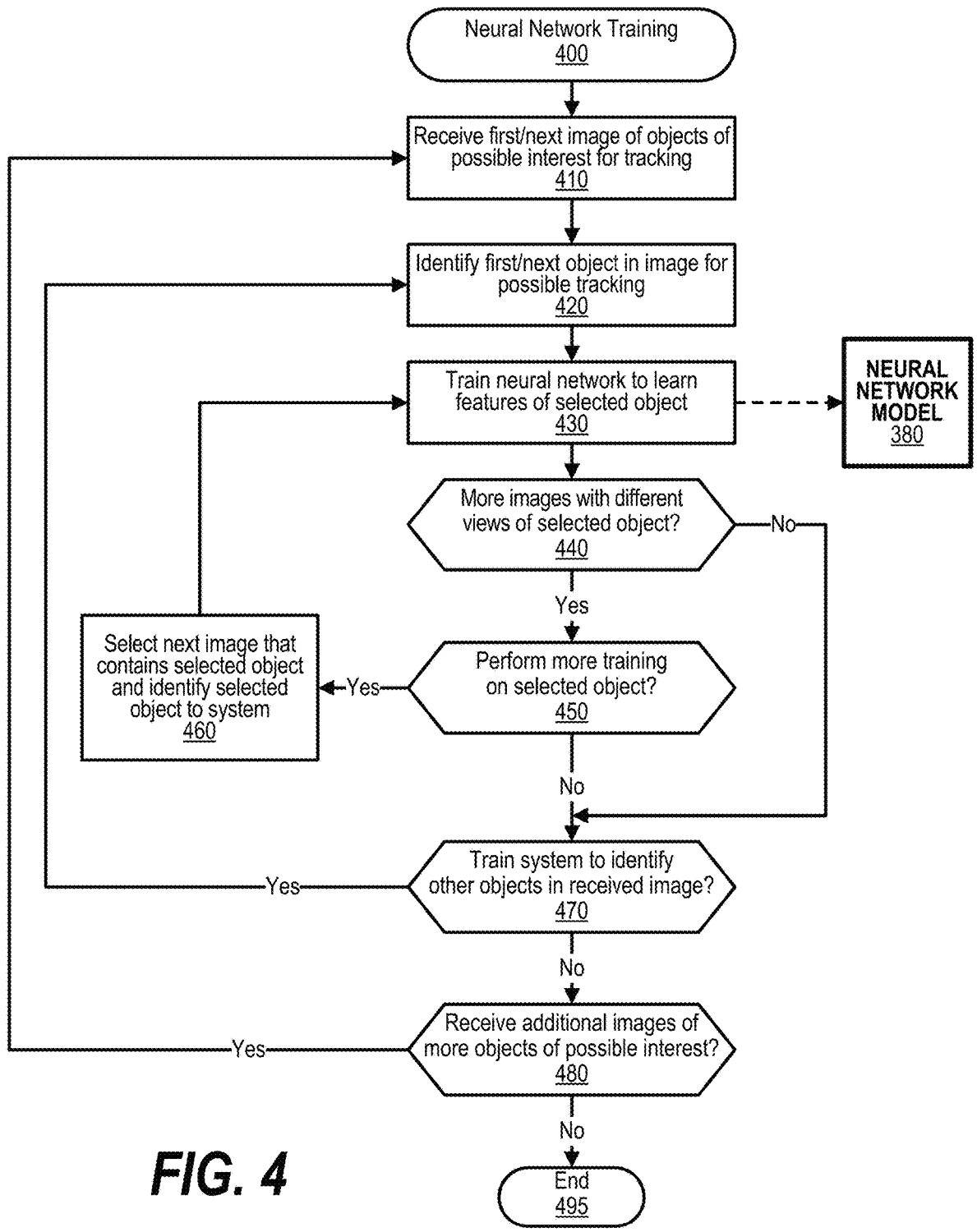
FIG. 4 is a flowchart showing steps taken by a process that shows steps performed to train a neural network regarding a device that is to be tracked.

FIG. 4 is a flowchart showing steps taken by a process that shows steps performed to train a neural network regarding a device that is to be tracked. FIG. 4 processing commences at 400 and shows the steps taken by a process that trains a neural network to identify one or more objects that are to be tracked. At step 410, the process receives the first image of objects of possible interest for tracking.

At step 420, the process identifies the first object in the image, such as a particular car from a group of cars, a particular asteroid from a group of asteroids, etc., for possible tracking at a future time. At step 430, the process trains neural network 380 so that the neural network learns the particular features of the selected object. The process determines as to whether there are more images with different views of the selected object that can be used for training (decision 440). If there are more images with different views of the selected object, then decision 440 branches to the 'yes' branch to further train the neural network regarding the object. On the other hand, if there are no more images of the selected object, then decision 440 branches to the 'no' branch ending the neural network's training on the object.

When additional images are encountered, the process determines whether to perform additional training of the neural network on the selected object using the additional image (decision 450). If more training on the selected object is needed, then decision 450 branches to the 'yes' branch which selects the next image in which the object appears at step 460 and processing loops back to step 430 to further train the neural network about this object. This looping continues until no more training on the selected object is needed, at which point decision 450 branches to the 'no' branch exiting the loop.

The process determines as to whether the system is being trained to identify other objects that also appear in the received image or images (decision 470). If the system is being trained to identify other objects that appear in the received image, then decision 470 branches to the 'yes' branch which loops back to step 420 to identify the next object in the image and train the neural network regarding the newly selected object as described above. This looping continues until there are no more objects appearing in the image being used to train the neural network model, at which point decision 470 branches to the 'no' branch exiting the loop.

The process next determines as to whether to receive additional images of more objects of possible interest (decision 480). If the system is receiving additional images of other objects of possible interest, then decision 480 branches to the 'yes' branch which loops back to step 410 to receive the next image and identify another object with which the neural network is to be trained. This looping continues until the system does not receive further images of other object to train the neural network, at which point decision 480 branches to the 'no' branch exiting the loop and processing thereafter ends at 495.

Figure 5:
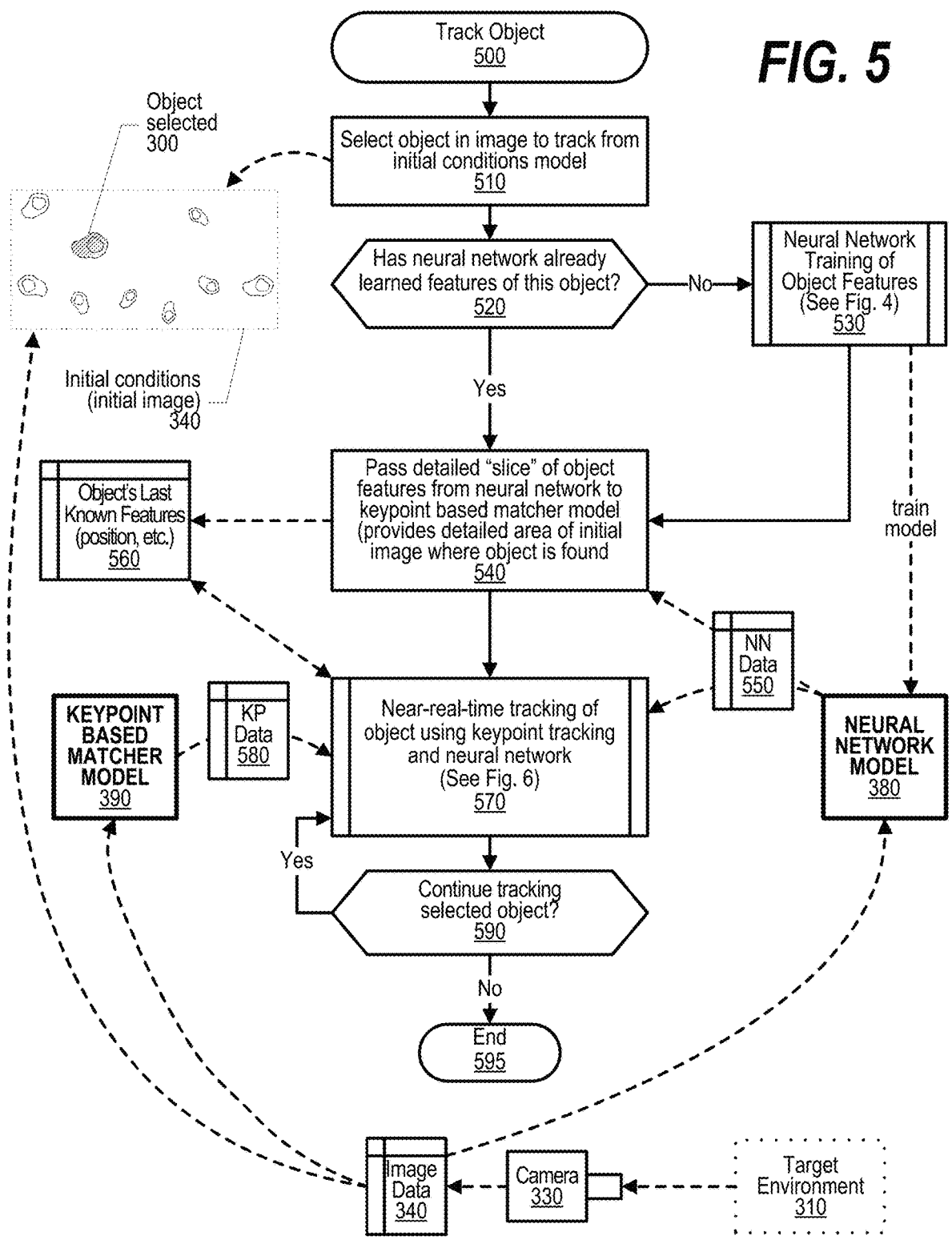
FIG. 5 is a flowchart showing steps taken by a process that initializes tracking of an object using both a keypoint matching model and a neural network model.

FIG. 5 is a flowchart showing steps taken by a process that initializes tracking of an object using both a keypoint matching model and a neural network model. FIG. 5 processing commences at 500 and shows the steps taken by a process that tracks an object using a combination of a keypoint-based (KP-based) matching model and a neural network based (NN-based) matching model. At step 510, the process selects an object that appears in a digital image to track from an initial conditions model. An initial conditions might be an initial digital image in which the selected moving object appears. In initial conditions 340, selected object 300 is the object that is being tracked. While tracking the selected object, other objects might occlude the selected object so that it does not appear in one or more subsequent images.

The process determines as to whether the neural network matching model has already learned the features of the selected object that is being tracked (decision 520). If the neural network has already learned the features of this object, then decision 520 branches to the 'yes' branch bypassing predefined process 530. On the other hand, if the neural network has not yet learned the features of this object, then decision 520 branches to the 'no' branch whereupon, at predefined process 530, the process performs the Neural Network Training of Object Features routine (see FIG. 4 and corresponding text for processing details). This results in neural network model 380 being trained regarding the features of the selected object.

At step 540, the process passes a detailed "slice" of object features learned by the neural network model to the keypoint based matcher model. Neural network data regarding the selected object is stored in memory area 550. This provides a detailed area, or location, within the initial image where the selected object is found. The initial set of data regarding the object is stored in memory area 560 which is used to keep track of the selected object's last known features, including the object's last known position within the last image that was processed.

Figure 6:
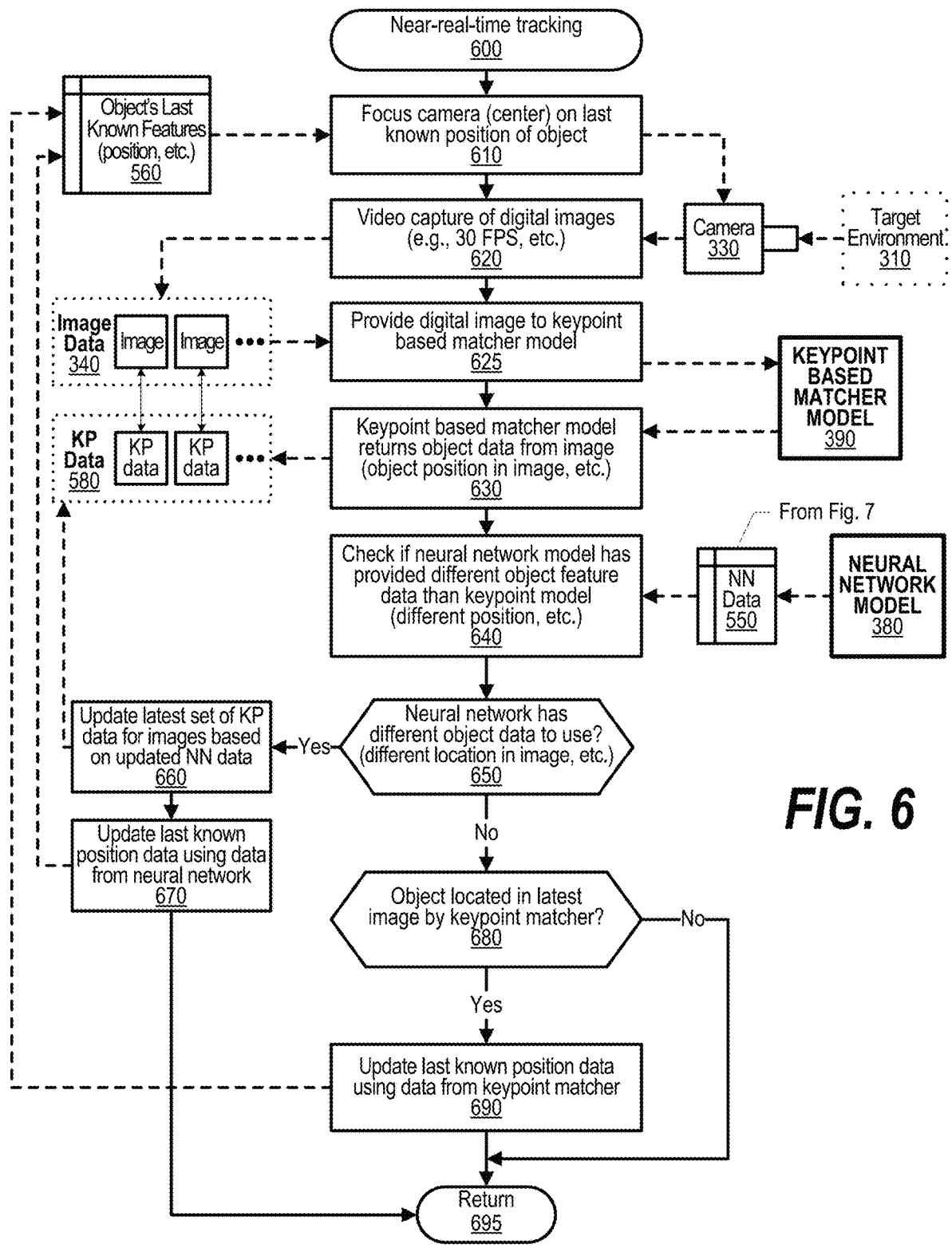
FIG. 6 is a flowchart showing steps taken by a process that performs near-real-time tracking of an object using both a keypoint matching model and a neural network model.

At predefined process 570, the process performs the near-real-time tracking of the selected object using the keypoint based matching model that tracks the object with a neural network routine enhancement routine that verifies that the keypoint based matching model is tracking the correct object (see FIG. 6 and corresponding text for processing details). As shown, the keypoint based matching model stores its data regarding the selected object in memory area 580 while the neural network based matching model stores its data in memory area 550. Both the keypoint based matching model data and the neural network based matching model data are utilized by predefined process 570 to perform the tracking of the object.

The process determines as to whether to continue tracking the selected moving object (decision 590). If tracking of the selected object continues, then decision 590 branches to the 'yes' branch which loops back to predefined process 570 to continue tracking the selected object. This looping continues until tracking of the selected object is terminated, at which point decision 590 branches to the 'no' branch exiting the loop. FIG. 5 processing thereafter ends at 595.

FIG. 6 is a flowchart showing steps taken by a process that performs near-real-time tracking of an object using both a keypoint matching model and a neural network model. FIG. 6 processing commences at 600 and shows the steps taken by a process that performs a near-real-time tracking of the selected object. At step 610, the process focuses (e.g., centers the camera, etc.) digital camera 330 on the last known position of the selected object within target environment 310. Target environment 310 might be an area of a street if an automobile is being tracked or an area of the sky if an asteroid or other flying object is being tracked. The last known position of the selected object in the last processed image is retrieved from memory area 560.

At step 620, the digital camera captures digital images of the area (e.g., at a certain rate, such as 30 frames-per-second (FPS), etc.). The image data (digital images) are stored in image data area 340. At step 625, the process provides the digital image data to keypoint based matching model 390. At step 630, the process receives object data from the keypoint based matching model (e.g., the object's position in the digital image, etc.). This keypoint based matching data is stored in KP data area 580. Each of the sets of KP based matching data corresponds to one of the digital images.

At step 640, the process checks if neural network model 380 has provided a different set of object feature data than the keypoint matching model (e.g., a different position of the selected object in the digital image, etc.). The neural network model provides NN data in memory area 550 which is compared to the corresponding KP data. Because the neural network model is more computationally complex to execute than the keypoint matching model, it is likely that there is not a set of NN data that corresponds with each of the sets of KP data. Instead, those sets of KP data that have a corresponding set of NN data are compared to ensure that the keypoint matching model is tracking the selected object.

The process determines as to whether the neural network based matching model has generated different object data to use than the keypoint based matching model (decision 650). If the neural network based matching model has generated different object data to use than the keypoint based matching model, then decision 650 branches to the 'yes' branch to perform steps 660 and 670. On the other hand, if both models are tracking the same selected object (the object data is the same or substantially similar), then decision 650 branches to the 'no' branch to perform steps 680 and 690.

Steps 660 and 670 are performed when the neural network based matching model has generated different object data to use than the keypoint based matching model. At step 660, the process updates the latest set of KP data for the digital images based on the updated NN data that is used to direct the keypoint based matching model to the selected object. At step 670, the process updates the last known position data using the NN data supplied by the neural network based matching model in memory area 550 with this data being stored in memory area 560.

Steps 680 and 690 are performed when both models are tracking the same selected object (the NN object data and the KP object data is the same or substantially similar). At decision 680, the process determines whether the selected object was located in the latest image by the keypoint based matching model (decision 680). If the selected object was located in the latest image by the keypoint based matching model, then decision 680 branches to the 'yes' branch whereupon, at step 690, the process updates the last known position of the selected object using the KP data generated by the keypoint based matching model with this data being stored in memory area 560. On the other hand, if the selected object could not be located in the latest image by the keypoint based matching process (e.g., the object is occluded, etc.), then decision 680 branches to the 'no' branch bypassing step 690. FIG. 6 processing thereafter returns to the calling routine (see FIG. 5) at 695.

FIG. 7 is a flowchart showing steps taken by a process that shows steps taken by a neural network model during the tracking of an object. FIG. 7 processing commences at 700 and shows the steps taken by a process that tracks a selected object using a neural network based matching model. At step 710, the process selects the latest available image (selecting every "x" image from image data based on camera FPS and time needed to run neural network model. While the neural network based matching model is processing this image, the keypoint based matching model shown in FIGS. 4 and 5 might be processing several incoming images as the keypoint based matching model is less computationally intense and therefore executes more quickly At step 720, the process attempts to identify features (position, etc.) of the object in the selected image using neural network based matching model 380. The execution of this model generally takes longer to execute than the keypoint based matching model. The process determines as to whether the selected object was located in the selected image by the neural network based matching model (decision 730). If the selected object was located in the selected image by the neural network based matching model, then decision 730 branches to the 'yes' branch to perform steps 740 through 795. On the other hand, if the selected object was not found in the selected image (possibly indicating that the selected object is occluded from view in the selected image), processing branches to the 'no' branch which loops back to step 710 to continue selecting and analyzing available images until the selected object is identified in one of the images (at which point the looping terminates and steps 740 through 795 are performed).

When the selected object is identified in the selected digital image, then, at step 740, the process retains NN data 550 and compares the new NN data to the corresponding KP data 580 that was observed for same image. Because the keypoint based matching process executes faster, it is very likely that the corresponding KP data is available when the NN data is generated. The process determines as to whether both the neural network based matching model and the keypoint based matching model are both tracking the same object (decision 750).

If both models are tracking the same object, then decision 750 branches to the 'yes' branch bypassing step 760. On the other hand, if both models are not tracking same object, then decision 750 branches to the 'no' branch whereupon, at step 760, the process notifies the main tracking process shown in FIG. 6 of the error and providing the keypoint based matching model with the latest object features (e.g., the selected object's location in the selected image, etc.) and the keypoint based matching process can update the KP data starting with this selected image.

The process determines whether to continue tracking the selected object (decision 770). If tracking of the selected object continues, then decision 770 branches to the 'yes' branch which loops back to step 710 to select and process the latest available image using the neural network based matching model as described above. This looping continues until tracking of the object is discontinued, at which point decision 770 branches to the 'no' branch exiting the loop and processing ends at 795.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute vithe processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system comprising a processor and a memory accessible by the processor, the method comprising:

capturing a plurality of digital images of an area, wherein the area includes a selected moving object and wherein the plurality of digital images are taken in a sequential time-based order;

determining that a keypoint-based (KP-based) matching model used to track the selected moving object by analyzing the plurality of digital images is no longer tracking the selected moving object, wherein the determining is based on comparing a neural network based (NN-based) location of the selected moving object with a KP-based location of the selected moving object;

identifying the neural network based (NN-based) location of the selected moving object in a selected one of the plurality of digital images using a NN-based matching model;

providing the NN-based location and the selected digital image to the KP-based matching model; and re-establishing tracking of the selected moving object in one or more digital images subsequent to the selected digital image using the KP-based matching model.

2. The method of claim 1 wherein the determining that the KP-based matching model is no longer tracking the selected moving object further comprises:

identifying a KP-based location in the selected digital image corresponding to where the KP-based matching model locates the selected moving object; and comparing the KP-based location to the NN-based location, wherein the determination is based on the comparison.

3. The method of claim 1 further comprising:

failing to identify a KP-based location in a set of one or more of the plurality of digital images due to an occlusion of the selected moving object; and identifying the NN-based location in the selected digital image that is captured after the capturing of at least one of the set of the digital images that was captured while the selected moving object was occluded.

4. The method of claim 1 further comprising:

initiating the tracking of the selected moving object by capturing a plurality of features pertaining to the selected moving object by the NN-based matching model; and providing a set of the features to the KP-based matching model to commence tracking of the selected moving object by the KP-based tracking model.

5. The method of claim 1 further comprising:

tracking the selected moving object in near-real-time by the KP-based matching model by locating the selected moving object in most of the plurality of digital images; and tracking the selected moving object in a fraction of the plurality of digital images by the NN-based matching model, wherein the KP-based matching model has a faster execution time than the NN-based matching model.

6. The method of claim 5 further comprising:

comparing the NN-based location identified during the tracking by the NN-based matching model with the KP-based location identified by the KP-based matching model, wherein the NN-based location and the KP-based location are identified in a common digital image; and determining that the KP-based matching model is no longer tracking the selected moving object in response to the KP-based location differing from the NN-based location.

7. The method of claim 1 further comprising:

training the NN-based matching model to identify the selected moving object prior to the tracking of the selected moving object.

8. An information handling system comprising:

one or more processors;

a memory coupled to at least one of the processors; and a set of computer program instructions stored in the memory and executed by at least one of the processors in order to perform actions comprising:

capturing a plurality of digital images of an area, wherein the area includes a selected moving object and wherein the plurality of digital images are taken in a sequential time-based order;

determining that a keypoint-based (KP-based) matching model used to track the selected moving object by analyzing the plurality of digital images is no longer tracking the selected moving object, wherein the determining is based on comparing a neural network based (NN-based) location of the selected moving object with a KP-based location of the selected moving object;

identifying the neural network based (NN-based) location of the selected moving object in a selected one of the plurality of digital images using a NN-based matching model;

providing the NN-based location and the selected digital image to the KP-based matching model; and re-establishing tracking of the selected moving object in one or more digital images subsequent to the selected digital image using the KP-based matching model.

9. The information handling system of claim 8 wherein the determining that the KP-based matching model is no longer tracking the selected moving object further comprises:

identifying a KP-based location in the selected digital image corresponding to where the KP-based matching model locates the selected moving object; and comparing the KP-based location to the NN-based location, wherein the determination is based on the comparison.

10. The information handling system of claim 8 wherein the actions further comprise:

failing to identify a KP-based location in a set of one or more of the plurality of digital images due to an occlusion of the selected moving object; and identifying the NN-based location in the selected digital image that is captured after the capturing of at least one of the set of the digital images that was captured while the selected moving object was occluded.

11. The information handling system of claim 8 wherein the actions further comprise:

initiating the tracking of the selected moving object by capturing a plurality of features pertaining to the selected moving object by the NN-based matching model; and providing a set of the features to the KP-based matching model to commence tracking of the selected moving object by the KP-based tracking model.

12. The information handling system of claim 8 wherein the actions further comprise:

tracking the selected moving object in near-real-time by the KP-based matching model by locating the selected moving object in most of the plurality of digital images; and tracking the selected moving object in a fraction of the plurality of digital images by the NN-based matching model, wherein the KP-based matching model has a faster execution time than the NN-based matching model.

13. The information handling system of claim 12 wherein the actions further comprise:
comparing the NN-based location identified during the tracking by the NN-based matching model with the KP-based location identified by the KP-based matching model, wherein the NN-based location and the KP-based location are identified in a common digital image; and
determining that the KP-based matching model is no longer tracking the selected moving object in response to the KP-based location differing from the NN-based location.

14. The information handling system of claim 8 wherein the actions further comprise:
training the NN-based matching model to identify the selected moving object prior to the tracking of the selected moving object.

15. A computer program product comprising:
a computer readable storage medium, comprising computer program code that, when executed by an information handling system, executes a digital assistant that performs actions comprising:
capturing a plurality of digital images of an area, wherein the area includes a selected moving object and wherein the plurality of digital images are taken in a sequential time-based order;
determining that a keypoint-based (KP-based) matching model used to track the selected moving object by analyzing the plurality of digital images is no longer tracking the selected moving object, wherein the determining is based on comparing a neural network based (NN-based) location of the selected moving object with a KP-based location of the selected moving object;
identifying the neural network based (NN-based) location of the selected moving object in a selected one of the plurality of digital images using a NN-based matching model;
providing the NN-based location and the selected digital image to the KP-based matching model; and
re-establishing tracking of the selected moving object in one or more digital images subsequent to the selected digital image using the KP-based matching model.

16. The computer program product of claim 15 wherein the determining that the KP-based matching model is no longer tracking the selected moving object further comprises:
identifying a KP-based location in the selected digital image corresponding to where the KP-based matching model locates the selected moving object; and
comparing the KP-based location to the NN-based location, wherein the determination is based on the comparison.

17. The computer program product of claim 15 wherein the actions further comprise:
failing to identify a KP-based location in a set of one or more of the plurality of digital images due to an occlusion of the selected moving object; and
identifying the NN-based location in the selected digital image that is captured after the capturing of at least one of the set of the digital images that was captured while the selected moving object was occluded.

18. The computer program product of claim 15 wherein the actions further comprise:
initiating the tracking of the selected moving object by capturing a plurality of features pertaining to the selected moving object by the NN-based matching model; and
providing a set of the features to the KP-based matching model to commence tracking of the selected moving object by the KP-based tracking model.

19. The computer program product of claim 15 wherein the actions further comprise:
tracking the selected moving object in near-real-time by the KP-based matching model by locating the selected moving object in most of the plurality of digital images; and
tracking the selected moving object in a fraction of the plurality of digital images by the NN-based matching model, wherein the KP-based matching model has a faster execution time than the NN-based matching model.

20. The computer program product of claim 19 wherein the actions further comprise:
comparing the NN-based location identified during the tracking by the NN-based matching model with the KP-based location identified by the KP-based matching model, wherein the NN-based location and the KP-based location are identified in a common digital image; and
determining that the KP-based matching model is no longer tracking the selected moving object in response to the KP-based location differing from the NN-based location.

* * * * *